Nov. 27, 1956 W. DARBY 2,771,782
RECIPROCATORY DRIVE FOR A RACK
Filed March 9, 1954 2 Sheets-Sheet 2

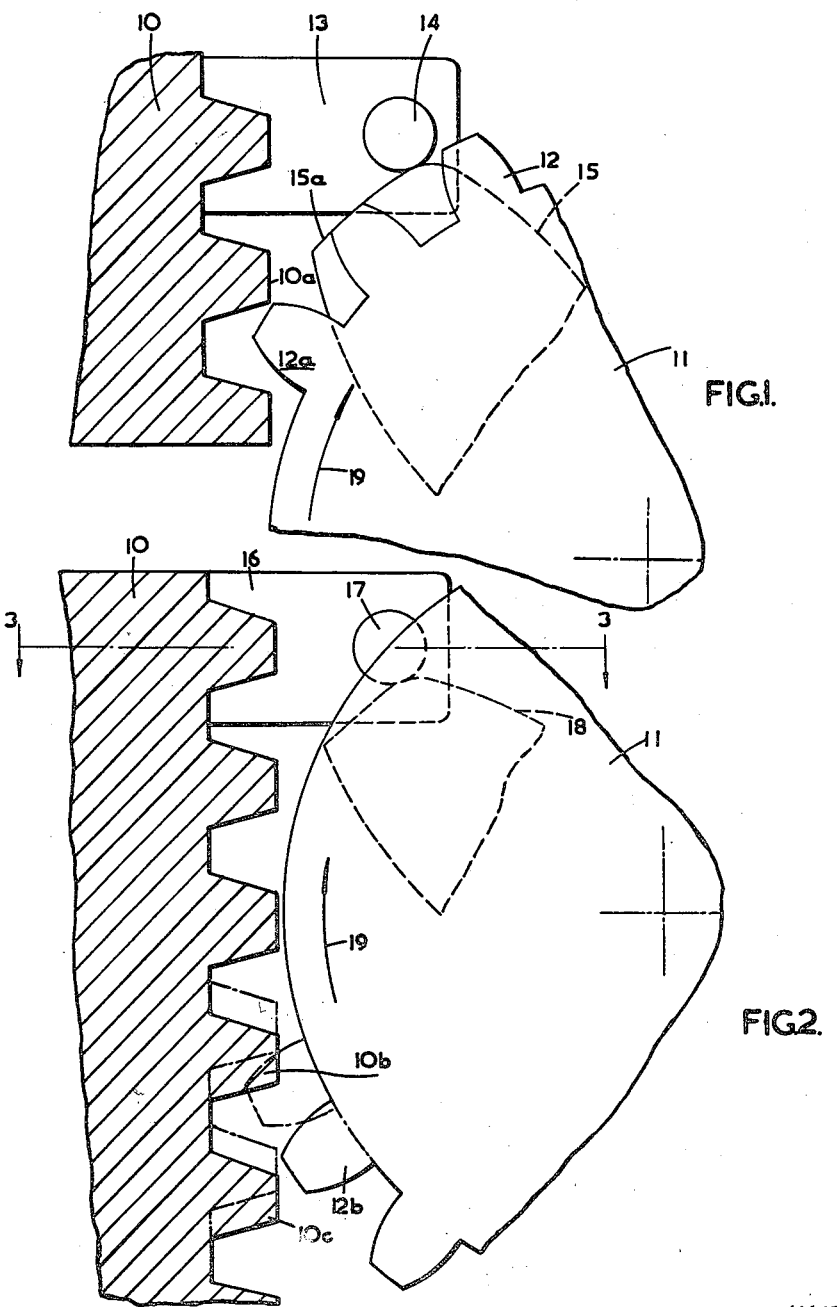

INVENTOR
WALTER DARBY ated Nov. 27, 1956

2,771,782

RECIPROCATORY DRIVE FOR A RACK

Walter Darby, Coventry, England, assignor to Stuart Davis Limited, Coventry, England Application March 9, 1954, Serial No. 415,021

Claims priority, application Great Britain March 24, 1953

1 Claim. (Cl. 74—32)

The invention relates to a reciprocatory drive, for a rack, of the kind in which the rack is moved in one direction against a load by a coacting, rotatively-driven, toothed quadrant of which the tooth at the trailing end of the series releases the rack for movement, due to the load, in the reverse direction. With drives of this kind it is possible for the tooth of the rack being disengaged by the said trailing tooth of the quadrant to wedge on the cresh of the quadrant tooth under the influence of the load, and the main object of the invention is a drive with which such wedging is avoided.

According to the invention, the rack is provided with an abutment to engage a cam, fast with the quadrant, for sustaining the rack until the trailing tooth of the quadrant has moved out of engagement with the coacting tooth of the rack.

According to a further feature, the trailing end of the cam surface is extended for, in conjunction with the abutment, controlling the initial portion of the return movement of the rack after it has been disengaged by the trailing tooth of the quadrant.

According to a still further feature, the cam, or another cam fast with the quardrant, has a leading end for engaging the abutment (or another abutment fast with the rack), after a return movement of the rack and prior to it being again moved in the said one direction, for correctly positioning the rack for one of its teeth to be properly engaged by the tooth at the leading end of the series on the quadrant.

In the drawings:

Figure 1 is a diagram, partly in elevation and partly in section, illustrating means according to the invention for facilitating disengagement of a rack and toothed quadrant;

Figure 2 is a view similar to Figure 1 and illustrating additional means according to the invention for facilitating the engagement of the teeth of a quadrant with those of a rack;

Figure 3:
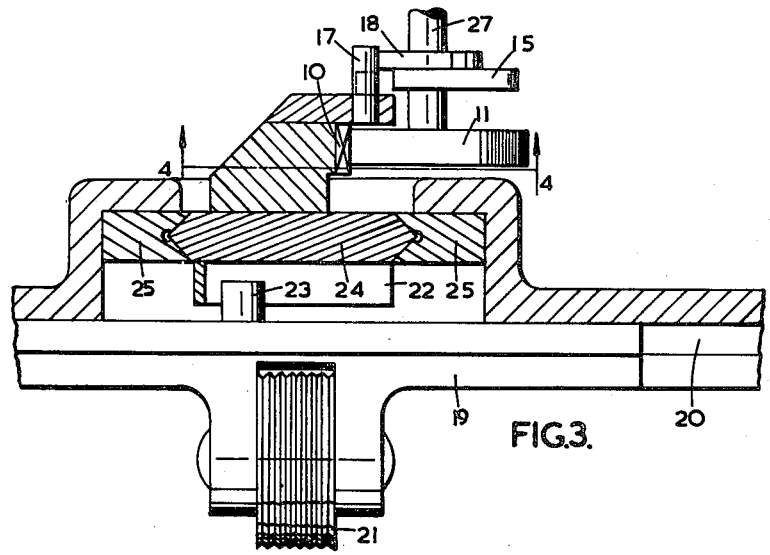
Figure 3 is a sectional view, to a smaller scale and generally on the line 3—3 of Figure 2, illustrating the means of the invention applied to a rack for moving a sine-bar.

Referring generally to Figures 1 and 2, the racks are indicated at 10 and the coacting quadrants at 11, the quadrants each having an arcuate series of teeth 12 of which the trailing tooth 12a is shown in Figure 1 as just disengaging the rack, and of which the leading tooth 12b is shown in Figure 2 as being just about to engage the rack. The two figures show the racks and quadrants in different relative positions, and the racks are biased, either by gravity or by some other means (e. g., a spring—not shown) to move in the downward direction in the figures.

Referring specifically to Figure 1, the rack shown has, near the foot thereof, an abutment 13 with a pin 14 which extends into the path of a cam 15 fast at one side of the quadrant.

In operation, and with the rack fully raised as shown, the quadrant 11, driven to rotate clockwise as indicated by the arrow 19, brings the cam 15 into engagement with the pin 14 for lifting the rack tooth 10a clear of the trailing quadrant tooth 12a, whereby the latter can move out of the downward path of the said rack tooth when disengagement of the cam and pin permits the rack to descend. By extending the cam surface as indcated at 15a, and applying a desired contour to it, the initial portion of the descent of the rack can be controlled.

Figure 2 shows the rack provided, near its top, with a second abutment 16 having a similar pin 17 for coaction with a sceond cam 18 fast with the quadrant. With the rack at the bottom of its travel and to be meshed by the leading tooth 12b of the quadrant, engagement of the cam 18 with the pin 17 positions the rack tooth 10b for correct engagement and ensures that the rack tooth 10c shall not obstruct the movement of the quadrant tooth 12b. To illustrate this function, the positions to which the quadrant tooth 12b and the rack teeth 10b and 10c are moved during the engagement are shown in chain lines, and it will readily be seen that if the rack tooth 10c were in the chain line position when the quadrant tooth 12b was in the full line position, it would obstruct the engaging movement of the quadrant.

It will, of course, be understood that the rack could be provided solely with the means shown in Figure 1, or it could additionally be provided with the means of Figure 2.

Figure 4:
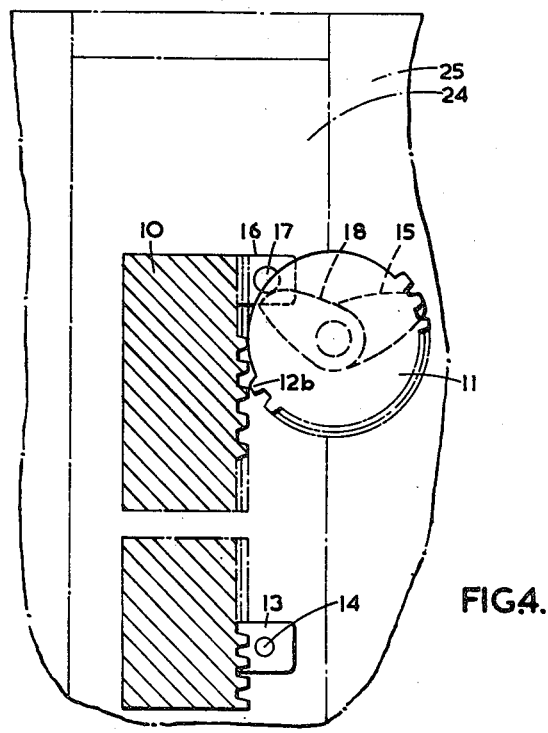
Figure 4 is an elevation, partly in section, on the line 4—4 of Figure 3.

In the practical application of both of the means, of Figures 1 and 2, shown in Figures 3 and 4, there is a carrier 19, working in ways 20 of a stationary part, for a ribbed crushing wheel 21 which is for dressing a thread-grinding wheel (not shown). The carrier 19 is movable, against a biassing means (also not shown) towards the right of Figure 3, by the engagement of a sine-bar 22 with a pin 23 fast with the carrier. The sine-bar is fast with a slide 24 working in ways 25, 25 which are at right-angles to the ways 20, and the slide 24 is driven from a rack 10 which is fast with it. The quadrant 11 is fast with a shaft 27 which also carries the cams 15 and 18, and the rack is shown in the position in which the cam 18 is just engaging the pin 17 for raising the rack into position for engagement by the leading quadrant tooth 12b. It is arranged for the number of teeth in the quadrant to be sufficient for correctly positioning the pin 14 when the rack is fully raised, whereby the rack can be released in the manner described with reference to Figure 1.

What I claim as my invention and desire to secure by Letters Patent of the United States is:

In combination, a toothed rack freely movable in one direction, a rotatable toothed quadrant for moving the rack in the other direction, the rack having fast with it an abutment, the quadrant having fast with it a cam to coact with the abutment for sustaining the rack, after movement in the said other direction, until the trailing tooth of the quadrant has moved out of engagement with the rack, a second abutment fast with the rack, and a second cam fast with the quadrant to engage the second abutment after the return movement of the rack and before it is again moved in the said other direction in order to correctly position the rack so that it can be properly engaged by the leading tooth of the quadrant.

References Cited in the file of this patent
UNITED STATES PATENTS

| | | |
|---|---|---|
| 265,632 | Powell | Oct. 10, 1882 |
| 423,322 | James | Mar. 11, 1890 |
| 631,635 | Hallberg | Aug. 22, 1899 |
| 1,362,901 | Simonton | Dec. 21, 1920 |
| 1,561,708 | Feagan | Nov. 17, 1925 |